United States Patent Office 2,955,949
Patented Oct. 11, 1960

2,955,949

PAINT DRIERS

Isidor Kirshenbaum, Westfield, Jeffrey H. Bartlett, New Providence, and Ober C. Slotterbeck, Rahway, N.J., assignors to Esso Research and Engineering Company, a corporation of Delaware No Drawing. Filed Sept. 17, 1958, Ser. No. 761,466

5 Claims. (Cl. 106—264)

This invention relates to an improved composition for driers to be used in paints, lacquers, varnishes, and enamels.

It relates particularly to tri-alkyl driers comprising the cobalt, manganese, and lead salts of a $C_8$ to $C_{20}$, preferably $C_{10}$ to $C_{16}$, branched chain carboxylic acid, at least 75% of which is a tri-alkyl acetic acid having a structural formula of the type:

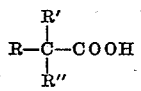

wherein R, R' and R" represent alkyl groups.

The object of this invention is to provide an improved drier which will possess (1) outstanding drier properties, (2) excellent solubility and compatibility characteristics, and (3) little or no odor.

In the manufacture of paints, lacquers, varnishes and enamels, the usual constituents include film-forming materials in which there is usually a drying oil, e.g. linseed oil, perilla oil, tung oil and soybean oil, solvents or vehicles to dissolve film-forming materials enabling such compositions to be applied, e.g. mineral spirits (petroleum naphtha) turpentine, kerosene and alcohol, diluents or thinners and in the case of some such compositions certain pigments. In addition to these, it is customary to employ a suitable quantity of an oxidation catalyst to speed up the normal drying rate of the oil so that the composition will dry hard within a reasonable time after it is spread on a surface in a thin film. The drying is a chemical change representing polymerization and oxidation; it is hastened by pretreatment of the oil, as in boiling the linseed oil, and by adding the driers, which are oxygen carriers usually soluble in oil. It is well known that driers commonly employed induce various oxidation phenomena, some of which are necessary and desirable, and some of which are very objectionable. The metallic salts of naphthenic, tall oil, 2-ethyl hexanoic acids and the metallic salts of acids prepared by the well known Oxo process have been used to produce these driers with varying degrees of effectiveness. If in the selection of a drier the choice be the salt of an organic acid, one must consider many properties of both the acid and the resulting drier salt. Among these are the film characteristics, i.e., the film properties of the paint, lacquer, varnish or enamel when the given drier is included in their composition. Here, consideration is given to drying time, hardness, flexibility, alkali resistance and stability, i.e., the effective storage on film properties. It is, of course, essential that the desired salt can be readily prepared from the acid in question. Obviously, a compatibility factor must also be considered. For example, the lead salts of 2-ethyl hexanoic acid are not stable and this factor has limited the use of this acid in drier production. Other properties unrelated to the actual drying process are equally important in commercial use. For instance, a drier having an irritating or otherwise annoying characteristic odor would be unsuitable for practical use. It is, therefore, essential that, in addition to the other aforementioned properties an outstanding drier must have little or no odor.

It has now been discovered that the cobalt, manganese and lead salts of $C_8$ to $C_{20}$ acids having the tri-alkyl acetic acid configuration form a stable drier having little or no odor and possessing outstanding drying properties. The $C_{10}$ tri-alkyl driers may include minor amounts of the $C_9$ and $C_{11}$ tri-alkyl driers without any noticeable change in quality. In some instances, minor amounts of $C_8$ tri-alkyl driers may be included with tri-alkyl driers of higher molecular weight. The $C_{13}$ tri-alkyl driers may include minor amounts of the $C_{12}$ and $C_{14}$ tri-alkyl driers without any noticeable change in quality. Of these, the tri-alkyl driers, made from $C_{10}$ tri-alkyl acetic acids, are preferred.

These acids may be prepared by reacting a suitable polyolefin with carbon monoxide in the presence of an acid catalyst e.g. $BF_3 \cdot 2H_2O$, $H_3PO_4$—$BF_3$—$H_2O$, conc. $H_2SO_4$ and $H_2SO_4$—$BF_3$—$H_2O$. Polyolefins, which are suitable for producing these acids, are $C_7$ to $C_{19}$, preferably $C_9$ to $C_{15}$ polyolefins, obtained by polymerizing propylene or propylene and butylene or by cracking higher molecular weight hydrocarbons such as those present in gas oils, cycle oils, etc. These acids may be produced either with the addition of water in the reactor phase or where the reaction is carried out in the absence of large amounts of water and the reaction product is later hydrolyzed.

EXAMPLE I

The acids used in demonstrating this invention were prepared from $C_9$ and $C_{12}$ polyolefin fractions produced from a polymerization feedstock of propylene containing small amounts of butylene.

The $C_9$ polyolefin feed was reacted with carbon monoxide at a temperature of 25° to 40° C. under a pressure of 1500 p.s.i.g. in the presence of approximately stoichiometric amounts of a catalyst, $BF_3$—$H_3PO_4$, to form the $C_{10}$ poly-alkyl acetic acid.

The $C_{12}$ polyolefin feed was reacted with carbon monoxide at a temperature of 25° to 45° C. under a pressure of 1500 p.s.i.g. in the presence of approximately stoichiometric amounts of $BF_3$—$H_3PO_4$ to form the $C_{13}$ poly-alkyl acetic acid. The time of reaction was 2 to 4 hours.

EXAMPLE II

Driers were formed by converting the $C_{10}$ and $C_{13}$ acids of Example I to lead, cobalt and manganese salts. The lead salts were prepared by the fusion method. The cobalt and manganese salts were prepared by precipitation or double decomposition method. These methods of preparing paint driers are described in standard reference sources such as "Encyclopedia of Chemical Technology," volume 5, pages 201 and 202, by Kirk-Othmer (Interscience, 1950), and "Protective and Decorative Coatings," by J. J. Mattiello, volume 1, pages 504 through 506 ff. (John Wiley, 1941). These driers may also be prepared by the process known in the paint trade as the solvent-reflux method or other conventional methods known to those in the art for preparing the corresponding salts of other organic acids. Hence, it is to be understood that the novelty herein lies in the use of the tri-alkyl acetic acids to form these driers and not in the conventional process of making the salts thereof.

The quantitative analysis of these driers for metal content was made and the results obtained are given in the following table:

*Analysis of poly-alkyl driers prepared from the acids of Example I*

| Acid | Percent Metal in Drier | | |
|---|---|---|---|
| | Lead Drier | Cobalt Drier | Manganese Drier |
| $C_{10}$ of Example I | 24.18 | 5.98 | 6.18 |
| $C_{13}$ of Example I | 24.02 | 5.90 | 5.91 |

In demonstrating this invention, the properties of the driers evaluated were odor, film characteristics, stability of driers on storage, and stability of coating compositions containing the driers.

Tests were made using a coating composition in which was incorporated the cobalt and lead driers of Example II. Comparisons were made with the corresponding salts of naphthenic, tall oil (hereinafter referred to as tallic acid), and 2-ethyl hexanoic acids. A further comparison was made with the corresponding salts of the $C_{10}$ acids made by the well known "Oxo process" wherein olefins are reacted with hydrogen and carbon monoxide at a temperature of 70 to 200° C. under a pressure between 100 and 300 atmospheres in the presence of a cobalt-containing catalyst to convert the olefin to an aldehyde which in turn is oxidized to produce the corresponding acid. This process produces a complex mixture of acids, a major proportion of which may be represented by the following formulae:

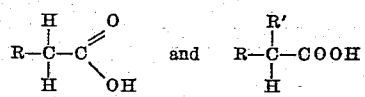

where R and R' represent alkyl groups.

EXAMPLE III $C_{10}$ Oxo acids were produced by the Oxo process above described using as the olefin feed a $C_9$ polyolefin fraction from a polymerization feedstock of propylene and small amounts of butylene.

EXAMPLE IV

The driers formed by converting the $C_{10}$ Oxo acids of Example III to their cobalt, manganese and lead salts were analyzed and the results obtained are given in the following table:

*Analysis of Oxo driers prepared from $C_{10}$ Oxo acids of Example III*

| Acid | Percent Metal in Drier | | |
|---|---|---|---|
| | Lead Drier | Cobalt Drier | Manganese Drier |
| $C_{10}$ Oxo acids | 24.08 | 5.98 | 6.04 |

The driers made from naphthenic, tallic and 2-ethyl hexanoic acids used herein for comparison are commercially used driers.

The medium chosen for testing the drier action was in all cases white enamel prepared by grinding 1150 grams $TiO_2$ and mixing this with 1640 grams of a 65% linseed oil air-drying alkyd resin. This mixture was thinned to 79.0 percent total solids with a petroleum hydrocarbon solvent known in the paint trade as mineral spirits.

METHODS OF EVALUATING FILM CHARACTERISTICS

Films were prepared from the enamel described above. In preparing the films, solutions were made containing 60% enamel solids. Cobalt and lead driers were added to these solutions until the percent of metal based on total enamel solids was in each test sample, cobalt 0.05, lead 0.5. This combination was then mixed for 24 hours. In addition to the films prepared 24 hours after the addition of the cobalt and lead driers, other films were prepared after the enamel containing the drier had been stored for 3 months and again at 6 months.

Dry film thicknesses of 1 mil were used in all tests. Films were air dried, aged, and tested at a constant temperature of 77° F. A relative humidity of 50% was maintained in the test room.

(a) *Drying time.*—(1) *Cotton free time.*—This is the amount of drying time required for cotton balls to be rolled freely down the film without sticking.

(2) *Tack free time.*—This is the amount of time required for film coated panels to fall cleanly away without tackiness from a smooth surface after 5 seconds of weighting with a 5-pound weight.

(b) *Hardness.*—Hardness of the film was determined after 7, 14, 21 and 28 days of drying time at 77° F. Relative values were obtained based on the value of plate glass at 100.

(c) *Alkali resistance.*—The alkali resistance of the film was determined after seven days' drying time. In this test, five drops of each of two sodium hydroxide solutions (1 and 5% in water) were placed on the film and allowed to stand for 30 minutes. Evaluations were made at once.

The results of this testing were as follows:

EXAMPLE V

*Drying characteristics and hardness of films when films prepared twenty-four hours after the addition of driers*

| Drier | Cotton Free (Hours) | Tack Free (Hours) | Hardness | | | | | |
|---|---|---|---|---|---|---|---|---|
| | | | 7 Days | 14 Days | 21 Days | 28 Days | 3 Mos. | 6 Mos. |
| Naphthenate | 1.5 | 39 | 14 | 16 | 16 | 16 | 24 | 24 |
| Tallate | 1.5 | 36 | 14 | 18 | 14 | 18 | 24 | 24 |
| 2-Ethyl-hexoate | 1.0 | 31 | 10 | 14 | 14 | 18 | 24 | 20 |
| Oxo $C_{10}$ | 1.5 | 28 | 12 | 14 | 14 | 20 | 26 | 24 |
| $C_{10}$ drier of Example 2 | 2.0 | 20 | 20 | 18 | 18 | 20 | 26 | 26 |
| $C_{13}$ drier of Example 2 | 3.0 | 40 | 14 | 18 | 16 | 16 | 20 | 24 |

EXAMPLE VI

*Drying characteristics and hardness of films when films prepared three months after the addition of driers*

| Drier | Cotton Free (Hours) | Tack Free (Hours) | Hardness | | | |
|---|---|---|---|---|---|---|
| | | | 7 Days | 14 Days | 21 Days | 28 Days |
| Naphthenate | 2.5 | 36 | 12 | 16 | 16 | 16 |
| Tallate | 2.5 | 36 | 12 | 16 | 16 | 16 |
| 2-Ethylhexoate | 2.5 | 30 | 12 | 14 | 16 | 12 |
| Oxo $C_{10}$ | 2.5 | 30 | 14 | 14 | 14 | 16 |
| $C_{10}$ drier of Example 2 | 2.0 | 30 | 20 | 18 | 18 | 20 |
| $C_{13}$ drier of Example 2 | 3.0 | 42 | 14 | 18 | 16 | 16 |

EXAMPLE VII

*Drying characteristics and hardness of films when films prepared six months after the addition of driers*

| Drier | Cotton Free (Hours) | Tack Free (Hours) | Hardness | | | |
|---|---|---|---|---|---|---|
| | | | 7 Days | 14 Days | 21 Days | 28 Days |
| Naphthenate | 2.5 | 38 | 12 | 18 | 18 | 22 |
| Tallate | 2.5 | 30 | 14 | 18 | 20 | 24 |
| 2-Ethylhexoate | 2.5 | 24 | 18 | 18 | 20 | 22 |
| Oxo $C_{10}$ | 2.5 | 22 | 12 | 16 | 20 | 22 |
| $C_{10}$ drier of Example 2 | 2.0 | 20 | 16 | 18 | 22 | 26 |
| $C_{13}$ drier of Example 2 | 2.0 | 24 | 18 | 20 | 20 | 24 |

Experimental and control driers were stored in the presence of steel at 77° F. The ratio of the volume of drier solution to the surface area of the steel pieces used in these experiments was calculated to simulate that expected for normal size steel drums used commercially for shipping and storing driers. Both full and half full containers were used. Viscosity measurements were made at monthly intervals. The color changes that occurred during the storage period were also observed. Measurements were also made on solutions in glass with no metal present. In another series of tests each drier was reduced ⅑ with mineral spirits and the solution stored at room temperature. Tests were also made of changes in viscosity of pigmented vehicles during storage.

COMPARATIVE EVALUATION OF DRIERS TESTED

*Odor.*—The tri-alkyl acetic acids have little or no odor and the driers prepared from them are very satisfactory from an odor standpoint. The Oxo acids, as well as the other acids tested, however, have a characteristic odor which is annoying; for example the odor of a drier solution made from $C_{10}$ Oxo acid is musk-like.

*Film characteristics.*—(a) *Drying time.*—In the tests made 24 hours, 3 months and 6 months after addition of the drier, the tri-alkyl $C_{10}$ drier was consistently superior to all other driers tested. In the test made 6 months after addition of the drier the tri-alkyl $C_{13}$ drier was equal or superior to the other driers tested except the tri-alkyl $C_{10}$ drier.

(b) *Hardness.*—In the tests started 24 hours after addition of the drier, the tri-alkyl $C_{10}$ drier was superior to all other driers tested. The hardness factor for the tri-alkyl $C_{13}$ drier was comparable to the controls.

In the tests started 3 months after addition of the drier, the tri-alkyl $C_{10}$ drier was again superior to all driers tested. The hardness factor for the tri-alkyl $C_{13}$ drier was again comparable to the controls.

In the tests started 6 months after addition of the drier both the tri-alkyl $C_{10}$ and $C_{13}$ driers were superior to all other driers tested.

*Resistance to alkali.*—This factor was the same for all driers tested.

*Stability.*—In general the tri-alkyl driers were equal or superior to the other driers tested. The tri-alkyl driers showed outstandingly low viscosity change. Satisfactory stability was demonstrated when stored in the presence of steel and when stored in glass with no metal present the tri-alkyl $C_{10}$ drier again exhibited superior properties.

The tri-alkyl acids herein discussed are compatible with cobalt, manganese, and lead, i.e., they readily form basic salts with each of these metals. This is an advantage over, for example, 2-ethyl hexanoic where excess acid is often required to solubilize lead.

The term "tri-alkyl acetic acid" as used herein shall be understood to mean a branched chain carboxylic acid having a structural formula of the type:

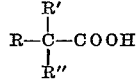

wherein R, R′, and R″ represent alkyl groups.

The term "tri-alkyl acids" referred to herein shall be understood to mean $C_8$ to $C_{20}$ branched chain carboxylic acids at least 75% of which are tri-alkyl acetic acids.

The term "tri-alkyl driers" used herein shall be understood to mean the cobalt, manganese and lead salts prepared from a $C_8$ to $C_{20}$ branched chain carboxylic acid, at least 75% of which are tri-alkyl acetic acids.

The term "$C_{10}$ acids" used herein shall be understood to mean acids prepared from a $C_9$ olefin fraction. Other acids referred to herein by a carbon number shall correspondingly be understood to mean acids prepared from an olefin fraction having a carbon number one less than that of the acid.

The term "$C_{10}$ driers" used herein shall be understood to mean driers prepared from a $C_{10}$ acid as defined herein. Other driers referred to herein by a carbon number shall be understood to mean driers prepared from the corresponding acid as defined herein.

The term "coating composition" used herein shall be understood to mean a composition selected from the group consisting of paints, lacquers, varnishes, and enamels.

Unless otherwise designated, all percentages recited herein refer to weight percent.

This application is a continuation-in-part of U.S. Serial No. 690,601, filed October 17, 1957, and now abandoned.

What is claimed is:

1. A composition consisting essentially of a drying oil and a metal salt of a $C_8$ to $C_{20}$ branched chain carboxylic acid having the structural formula

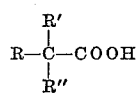

wherein R, R′ and R″ represent alkyl radicals, and wherein said metal is selected from the group consisting of cobalt, manganese, and lead.

2. A composition according to claim 1 wherein said drying oil is linseed oil.

3. A coating composition selected from the group consisting of paints, lacquers, varnishes and enamels containing a salt of a $C_8$ to $C_{20}$ branched chain carboxylic acid, at least 75% of which may be represented by the structural formula

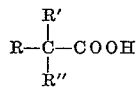

wherein R, R′ and R″ represent alkyl radicals, and a metal of the group consisting of cobalt, manganese, and lead.

4. A coating composition according to claim 3 in which the coating composition is an enamel.

5. In the process of compounding a coating composition selected from the group consisting of paints, lacquers, varnishes and enamels, which comprises blending a film-forming material and a drying oil, the improvement which comprises admixing therewith a metal salt of a $C_8$ to $C_{20}$ branched chain carboxylic acid having the structural formula

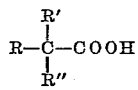

wherein R, R′ and R″ represent alkyl radicals, wherein said metal is selected from the group consisting of cobalt, manganese and lead.

References Cited in the file of this patent

UNITED STATES PATENTS

| | | |
|---|---|---|
| 2,251,798 | Meidert et al. | Aug. 5, 1941 |
| 2,561,791 | Elwell et al. | July 24, 1951 |

FOREIGN PATENTS

| | | |
|---|---|---|
| 677,175 | Great Britain | Aug. 13, 1952 |